United States Patent
Piper et al.

(10) Patent No.: US 6,707,377 B2
(45) Date of Patent: Mar. 16, 2004

(54) REMOTE CONTROL APPARATUS AND METHOD

(75) Inventors: Curtis R. Piper, Hayward, CA (US); R. Thomas Mueller, San Ramon, CA (US)

(73) Assignee: Ironhead, Inc., Costa Mesa, CA (US)

( * ) Notice: Subject to any disclaimer, the term of this patent is extended or adjusted under 35 U.S.C. 154(b) by 0 days.

(21) Appl. No.: 10/327,683

(22) Filed: Dec. 20, 2002

(65) Prior Publication Data

US 2003/0160704 A1 Aug. 28, 2003

Related U.S. Application Data

(63) Continuation of application No. 09/437,624, filed on Nov. 10, 1999, now abandoned.
(60) Provisional application No. 60/111,463, filed on Dec. 9, 1998, and provisional application No. 60/107,984, filed on Nov. 12, 1998.

(51) Int. Cl.⁷ .............................................. B60R 25/10
(52) U.S. Cl. .................. 340/427; 340/539.11
(58) Field of Search ................. 340/427, 440, 340/539.11, 540, 5.64; 362/473, 474, 475; 2/422, 438, 447

(56) References Cited

U.S. PATENT DOCUMENTS

| | | | | |
|---|---|---|---|---|
| 3,944,924 A | * | 3/1976 | Miyaci | 455/575 |
| 5,045,971 A | * | 9/1991 | Ono et al. | 361/704 |
| 5,748,101 A | * | 5/1998 | Christensen et al. | 340/5.64 |
| 5,841,345 A | * | 11/1998 | Kestenberg | 340/440 |
| 6,047,412 A | * | 4/2000 | Wilon, II et al. | 2/438 |
| 6,152,585 A | * | 11/2000 | Barry | 362/473 |

* cited by examiner

*Primary Examiner*—Van Trieu
(74) *Attorney, Agent, or Firm*—Knobbe, Martens, Olson & Bear, LLP

(57) ABSTRACT

A remote control is remotely mounted and controlled by an activation switch. The remote control is mounted within a cavity of a motorcycle and in electrical communication with an activation switch. The activation switch is mounted for easy access and manipulation. A feedback device is provided for communicating that the remote control has been activated. A universal mounting bracket allows the operator to selectively mount the activation switch and feedback device in any location they desire.

13 Claims, 20 Drawing Sheets

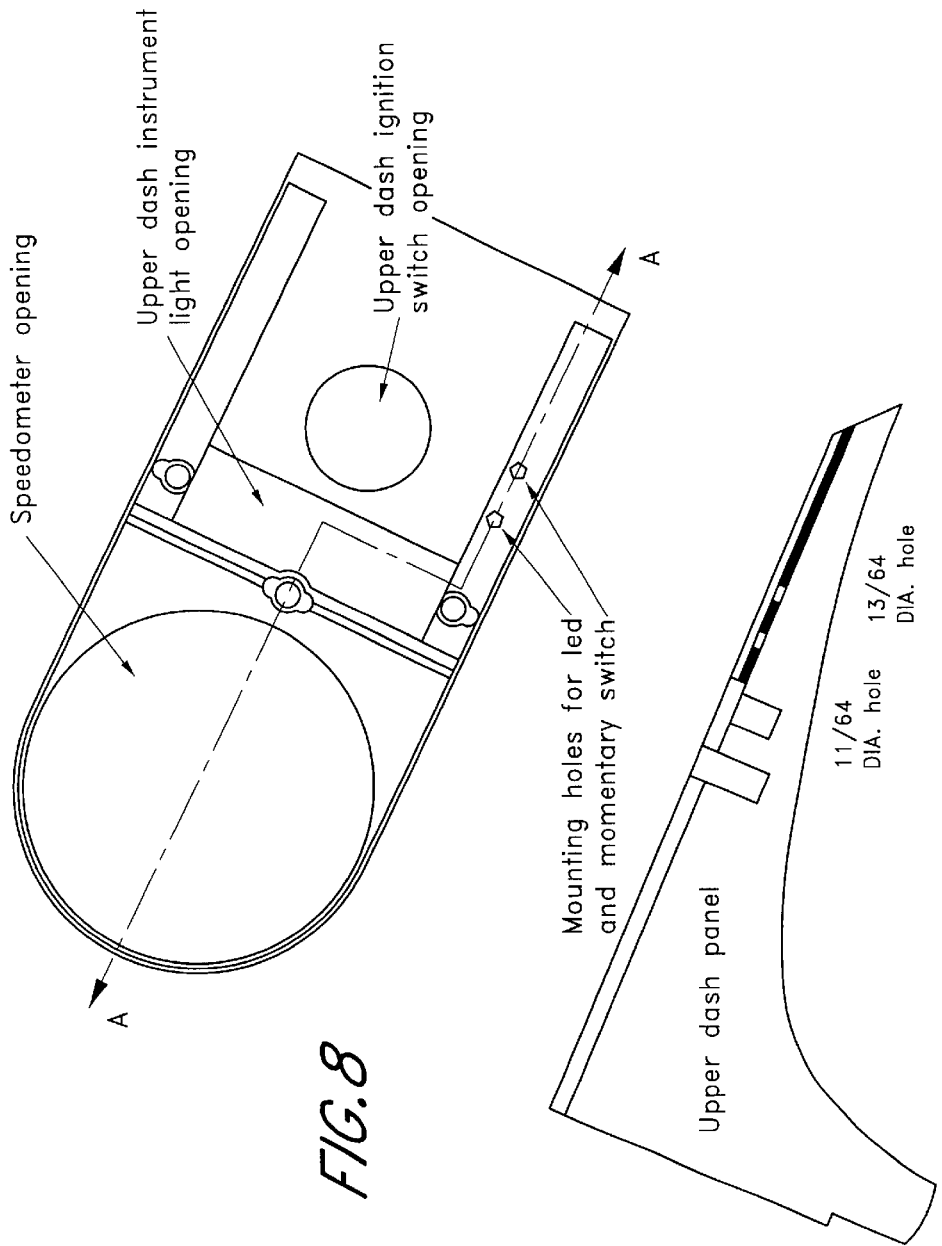

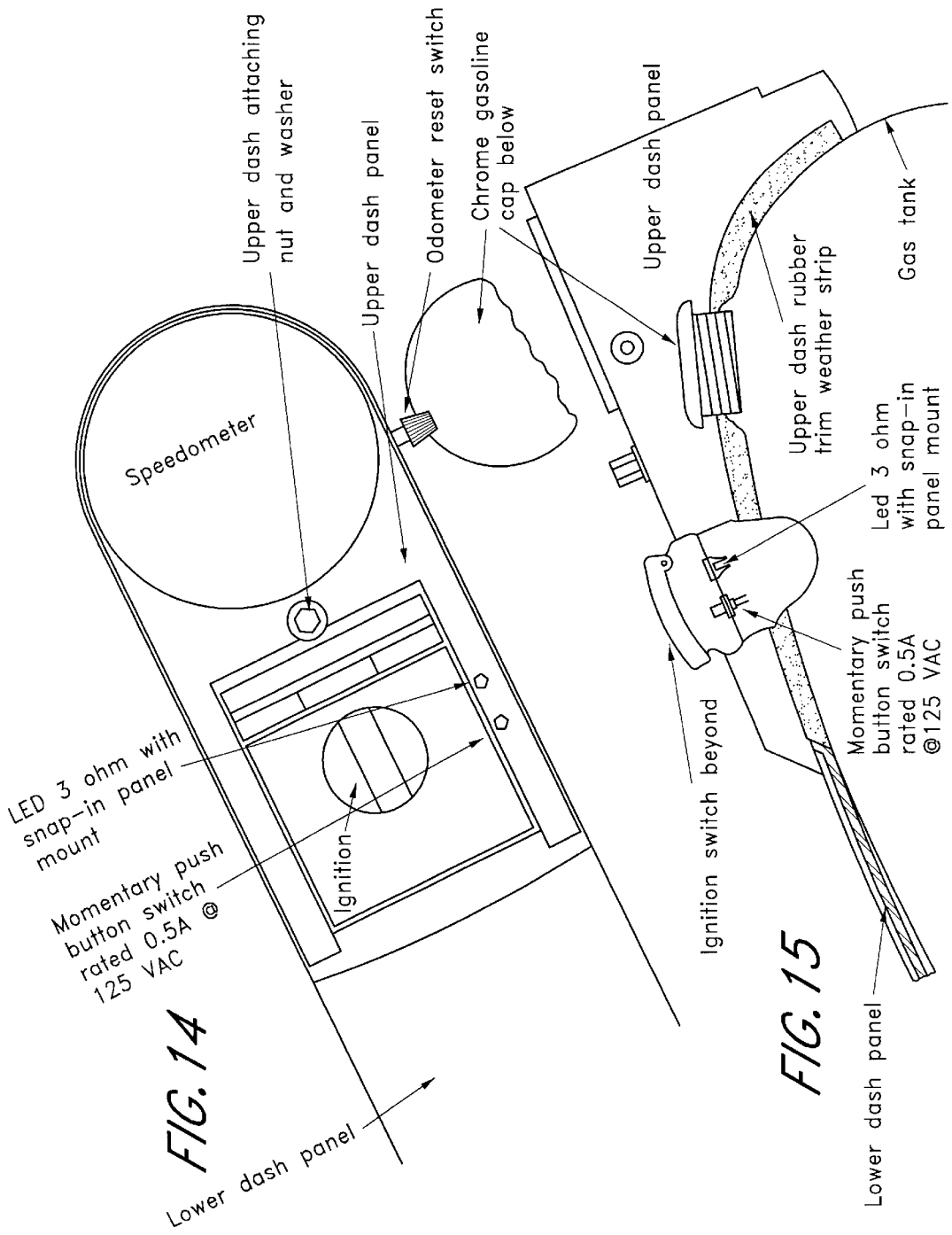

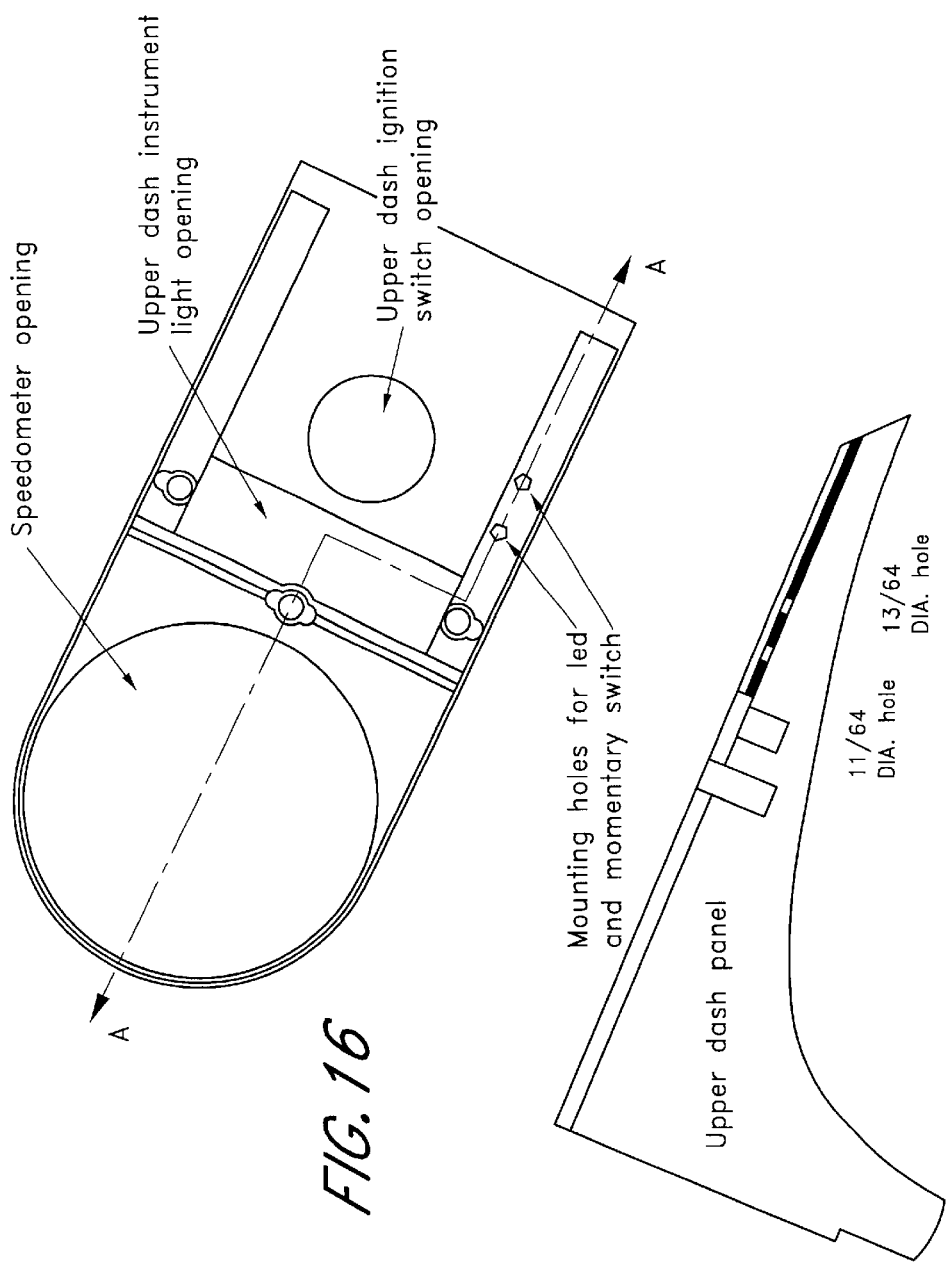

though the invention is not so limited. Aside from the particular subject matter of the present invention, the details of the motorcycle will not be described hereinafter.

REMOTE CONTROL APPARATUS AND METHOD

RELATED APPLICATIONS

The present application is a continuation of U.S. application Ser. No. 09/437,624, which was filed on Nov. 10, 1999, now abandoned, and which claimed the priority benefit under 35 U.S.C. § 119(e) of U.S. Provisional Patent Application No. 60/107,984, filed on Nov. 12, 1998 and U.S. Provisional Patent Application No. 60/111,463, filed on Dec. 9, 1998.

BACKGROUND OF THE INVENTION

1. Field of the Invention

The present invention generally relates to remote control devices for motor vehicles. Specifically, the present invention relates to a remote activation device for a remote control and a method of installing and using the same.

2. Description of the Related Art

Previously, remote garage door openers were provided with bulky transmitters which were easily lost or misplaced. For the operators of motorcycles, the use of such transmitters was replete with inconveniences. For instances, due to limited on-board storage locations, the transmitter is commonly placed in pockets or carried with the operator while not on the motorcycle. Accordingly, the transmitter is often misplaced or inconveniently located when the operator is ready to leave home. Additionally, the transmitter must be fished from the pocket when attempting to use it. As can be imagined, it is extremely difficult and dangerous to operate such a transmitter while also attempting to maneuver or balance a motorcycle. The level of difficulty is additionally augmented when the operation of the motorcycle is in adverse or cold weather conditions (i.e., the operator is wearing gloves which decrease tactile sensitivity).

SUMMARY OF THE INVENTION

Accordingly, one aspect of the present invention involves the recognition that an on-board configuration for a motorcycle remote control is desirable. The on-board configuration allows for ease of use and eliminates the need to find and handle a separate transmitter.

Another aspect of the present invention involves concealing and mounting the remote control apparatus within a cavity of the motorcycle. Such a mounting location decreases the weather-exposure of the apparatus and increases the security of the apparatus.

A further aspect of the present invention involves connecting a remote activating switch and an activation confirmation indicator to the remote control and mounting the pair in an easily accessible and easily viewed location. The activating switch desirably being placing to be actuated with the hand or foot of the operator. The activation confirmation indicator allowing the operator to have auditory, visual or tactile confirmation of the operation of the remote control.

BRIEF DESCRIPTION OF THE DRAWINGS

These and other features of the invention will now be described with reference to the drawings of a preferred embodiment which is intended to illustrate and not to limit the invention, and in which:

FIGS. 2 and 2a are plan views of the motorcycle of FIG. 1;

FIGS. 3 and 3a are side view of the motorcycle of FIG. 1, with a portion broken away to illustrate an activation switch or switches and a confirmation indicator;

FIG. 8 is a plan view of a motorcycle dash board illustrating a preferred mounting arrangement;

FIG. 9 is a side cross-sectional view of FIG. 8;

FIG. 14 is a plan view of an exemplary motorcycle illustrating a portion of a remote control apparatus having features and aspects in accordance with the present invention;

FIG. 15 is a side view of the motorcycle of FIG. 14;

FIG. 16 is a plan view of a motorcycle dash board illustrating a preferred mounting arrangement;

FIG. 17 is a side cross-sectional view of FIG. 16;

DETAILED DESCRIPTION OF THE PREFERRED EMBODIMENT

Figure 1:
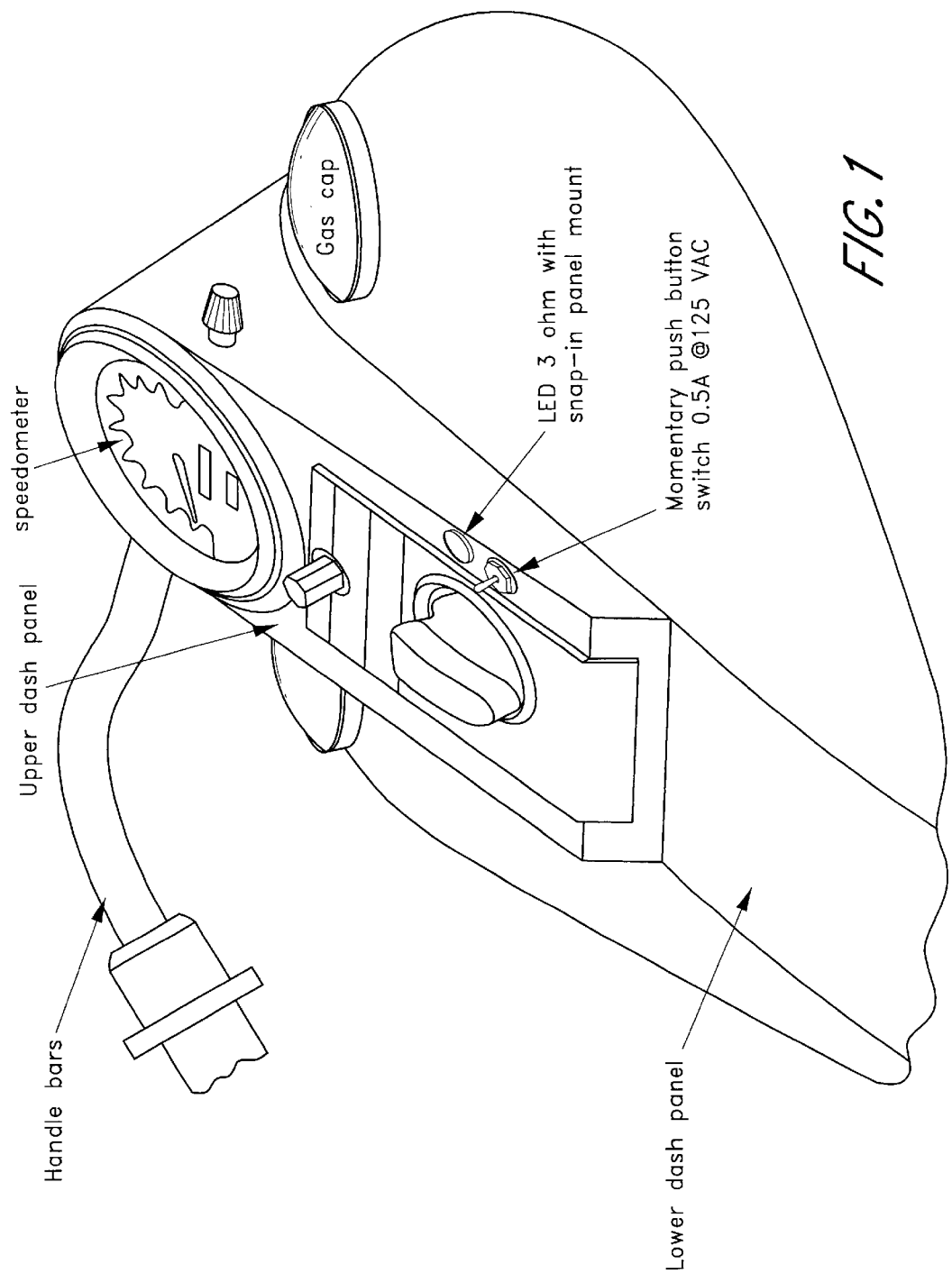
FIG. 1 is a perspective view of an exemplary motorcycle illustrating a portion of a remote control apparatus having features and aspects in accordance with the present invention.
Figure 2:
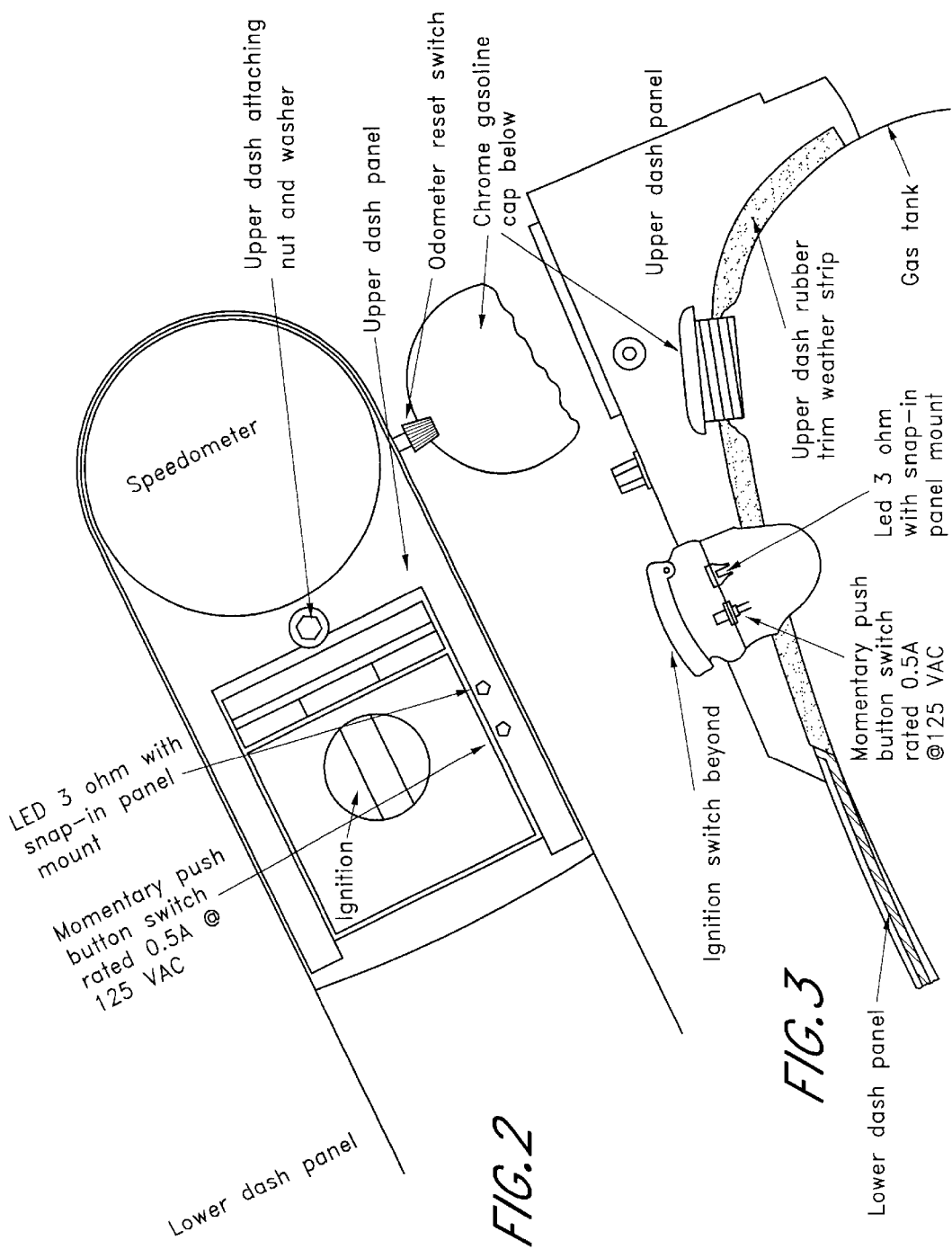

With reference to FIGS. 1 and 2, a motorcycle having a remote control apparatus is illustrated. The remote control communicates with a receiver to control any of a number of devices. For instance, the remote control may be configured to operate all major brands of garage door and gate openers. Thus, the remote control and receiver are designed, in part, to allow access to property, structures or other secured areas from a motorcycle or a similar vehicle. Additionally, the remote control and receiver may also be configured to turn on or off other devices such as house lights, house alarms, or any other appliances as desired by the operator.

As is well-known, the motorcycle to which the remote control is mounted generally comprises a frame to which at least one fuel tank is mounted. In the illustrated embodiment, the motorcycle has two fuel tanks mounted to the frame such that one fuel tank is arranged on either side of the frame. The motorcycle provides an exemplary environment in which the present remote door opening remote control finds utility. As will be recognized by those of skill in the art, the present remote door opening remote control may also be used in all-terrain vehicles, snowmobiles, bicycles, wheelchairs, lawnmowers, golf carts and the like.

With reference to FIG. 1, the remote door opening remote control generally comprises a concealed remote control, an activation switch and a confirmation indicator. The activation switch and the confirmation indicator are desirably arranged to be readily accessible and within a clear view of an operator of the motorcycle. In the illustrated embodiment, the activation switch and the confirmation indicator are mounted to one side of the upper dash panel of the motorcycle. The activation switch and confirmation indicator can also be attached to the lower dash panel as well. Desirably, they are proximate to the ignition switch, below the speedometer and arranged among the other gauges which are often viewed by the operator. As will be recognized by those of skill in the art, the activation switch and confirmation indicator need not be located in tandem, as illustrated, but may be arranged remotely from one another. Additionally, the activation switch may be located in other easily accessible locations, such as, for instance, the handlebars adjacent to the handgrips.

Another aspect of the present remote control utilizes a universal mounting bracket which allows the ultimate operator to determine an advantageous location for mounting the activation switch. As illustrated, the universal mounting bracket generally comprises a pair of c-shaped clamps which, when fastened together, form a clam-shell arrangement. The structure of the c-shaped clamps allow the clamps to accommodate a variety of pipe sizes. The mounting bracket may be made from aluminum, steel, plastic or any other suitable material. Additionally, the mounting bracket may be stamped, forged, molded or manufactured in any other suitable manner.

Following identification of a desired mounting location, the location is prepared for the installation. Specifically, the location may be wrapped with a rubberized tape or other vibration-reducing component. The rubberized tape also protects the surface finish in the event the remote control is later removed from the motorcycle.

Following preparation of the location, the confirmation indicator and the activation switch are inserted into their respective mounting holes in the mounting bracket. The activation switch may be attached using a retaining nut and washer as is well known in the art. The confirmation indicator may be attached using a vinyl grommet as is also well known in the art. The grommet can also be of any pliant material, such as rubber, for instance.

Having mounted the activation switch and the confirmation indicator, the two halves of the clam-shell mounting bracket can be joined together around the prepared pipe. In the illustrated embodiment, the halves are joined using threaded fasteners, such as a machine bolt and a lock nut. Having secured the bracket to the pipe, the positioning of the bracket may be adjusted to a desired rotational orientation. The wires may then be connected as described below.

In the illustrated embodiment, the confirmation indicator is an led lamp. Specifically, the confirmation indicator is a 3-ohm led with a snap-in mounting ring. Other led lamps may also be used. Moreover, other confirmation indicators can also be used. For instance, the confirmation indicator can be an existing indicator lamp, a tactile alert such as a vibrating element, or an auditory signal. Additionally, any combination of indicators can be used.

The illustrated activation switch is desirably a momentary push button switch. Specifically, the activation switch is a momentary push button switch rated to about 0.5 amps at about 125 volts AC. As will be recognized, other activation switches may also be used. Importantly, because of the application, it is desired that the switch allow the remote control to transmit a signal for a brief duration. It is contemplated that a timing circuit could be incorporated to accomplish this; however, it is preferable to utilize a momentary switch. An additional switch can also be provided to operate more than one device as illustrated in FIGS. 2a and 3a.

Figure 3:
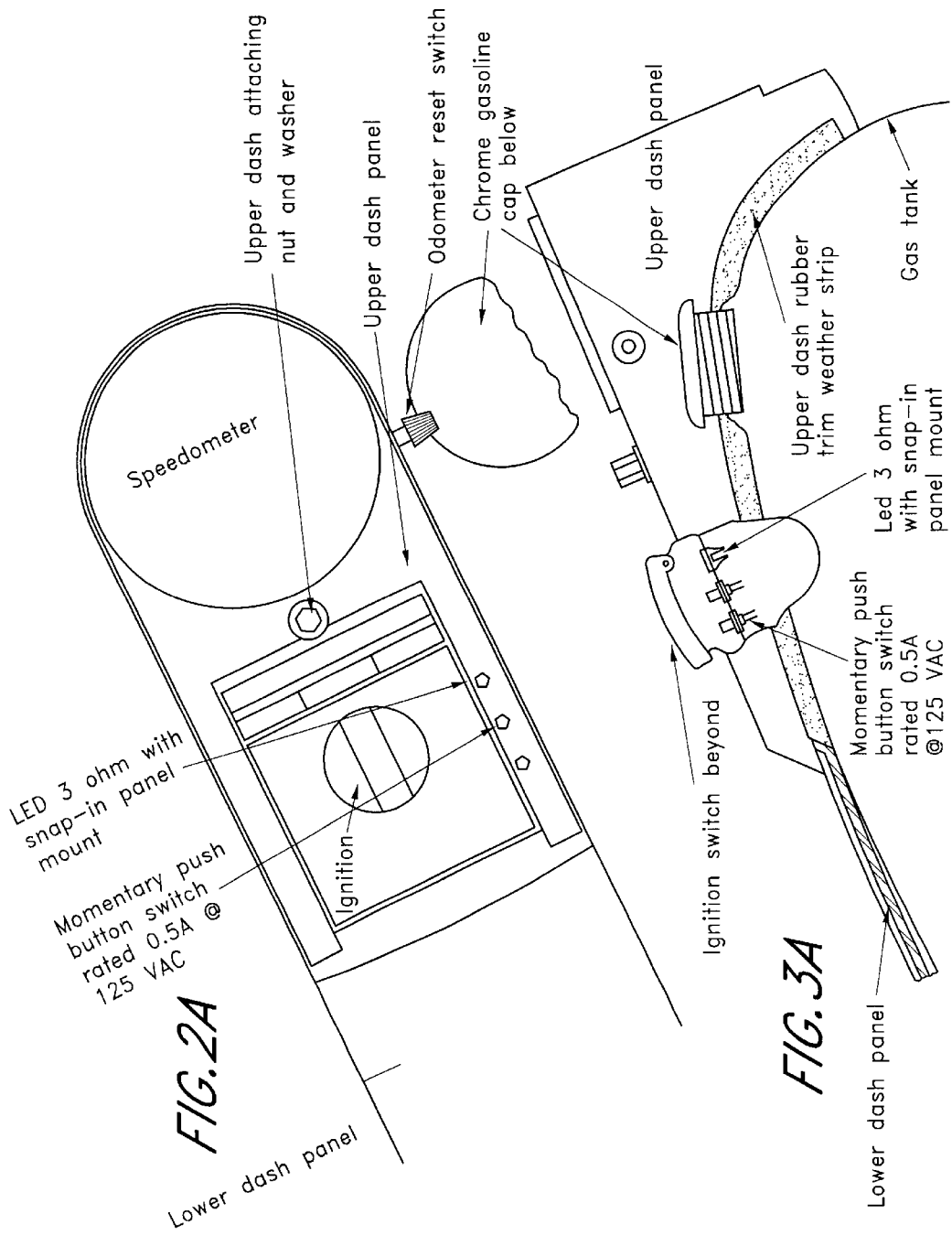
Figure 4:
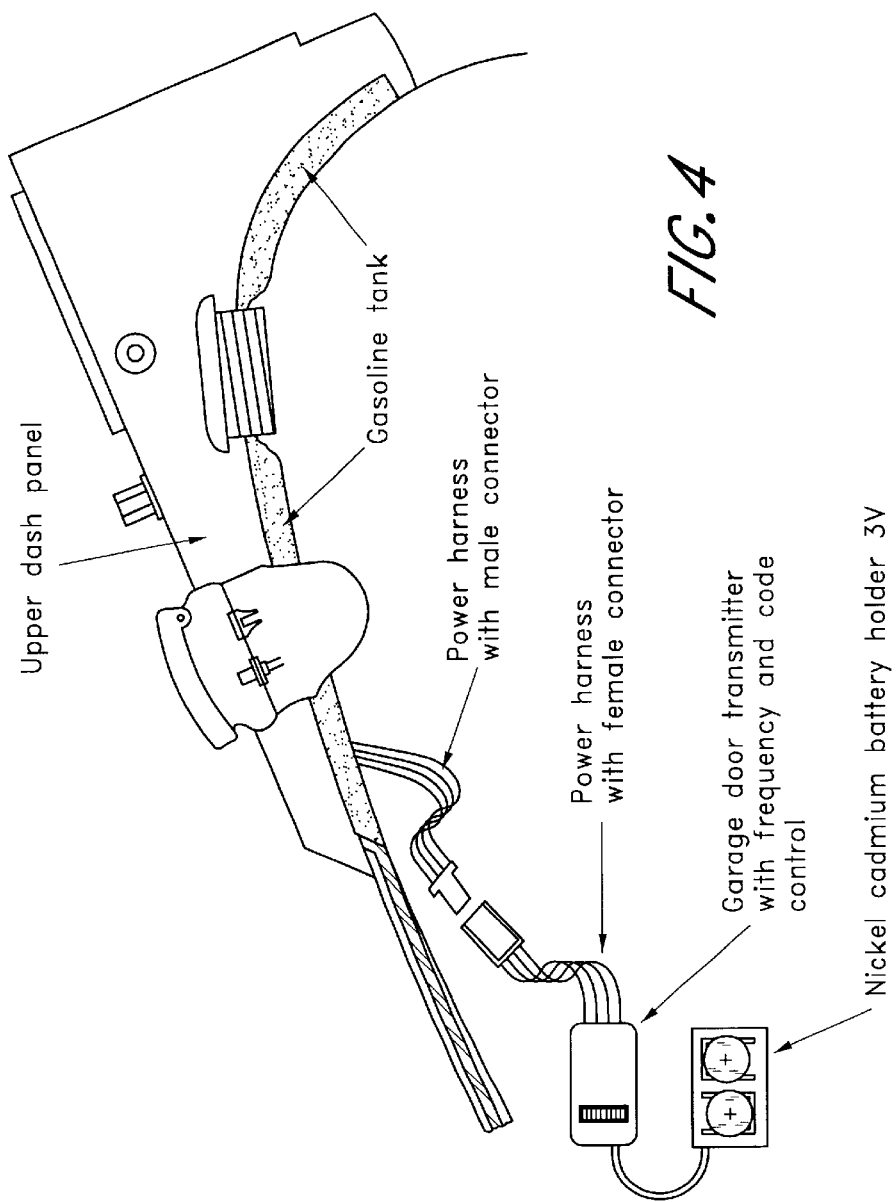
FIG. 4 is schematic view of a remote control apparatus arrangement.
Figure 5:
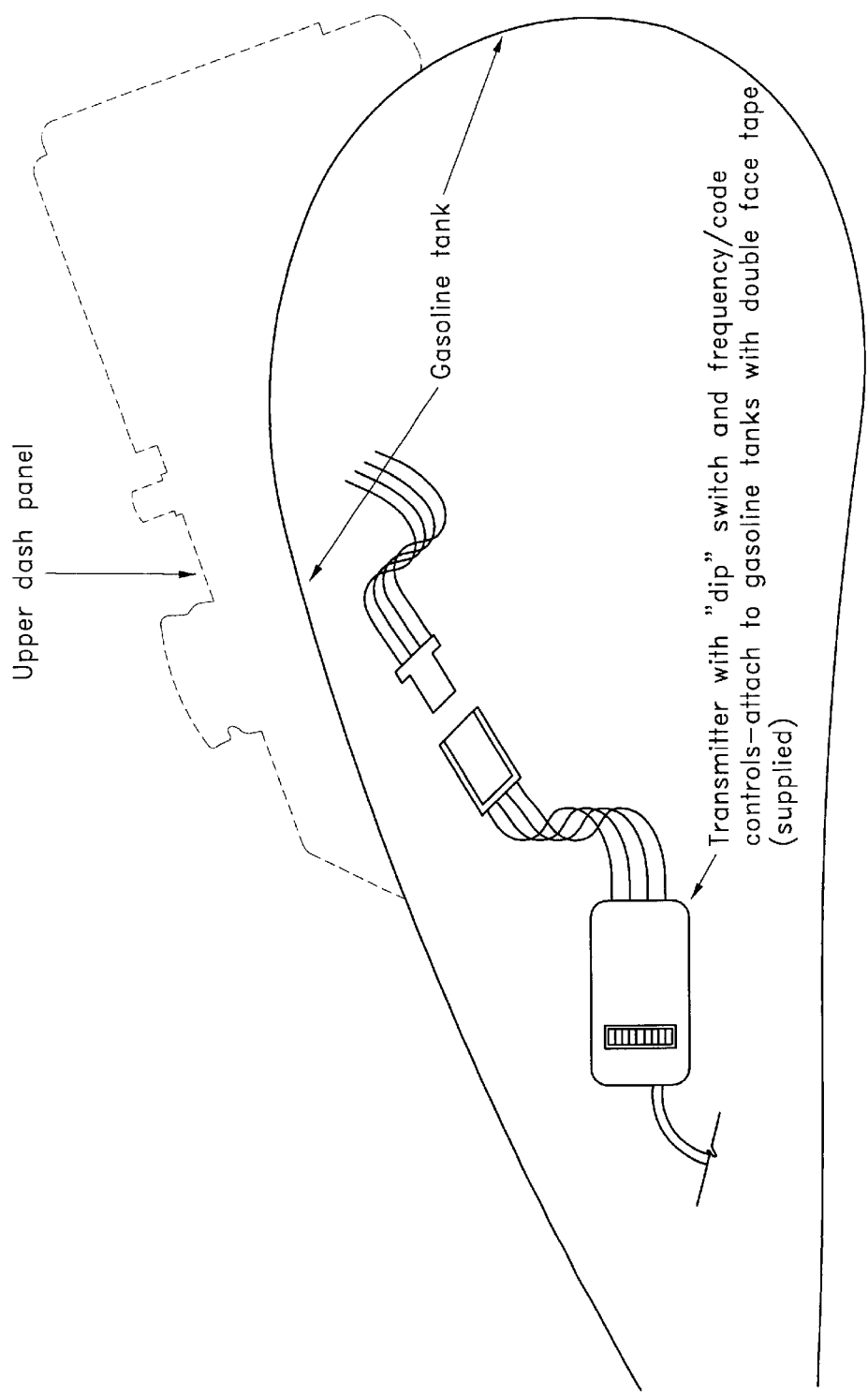
FIG. 5 is another schematic view of a remote control apparatus arrangement.
Figure 6:
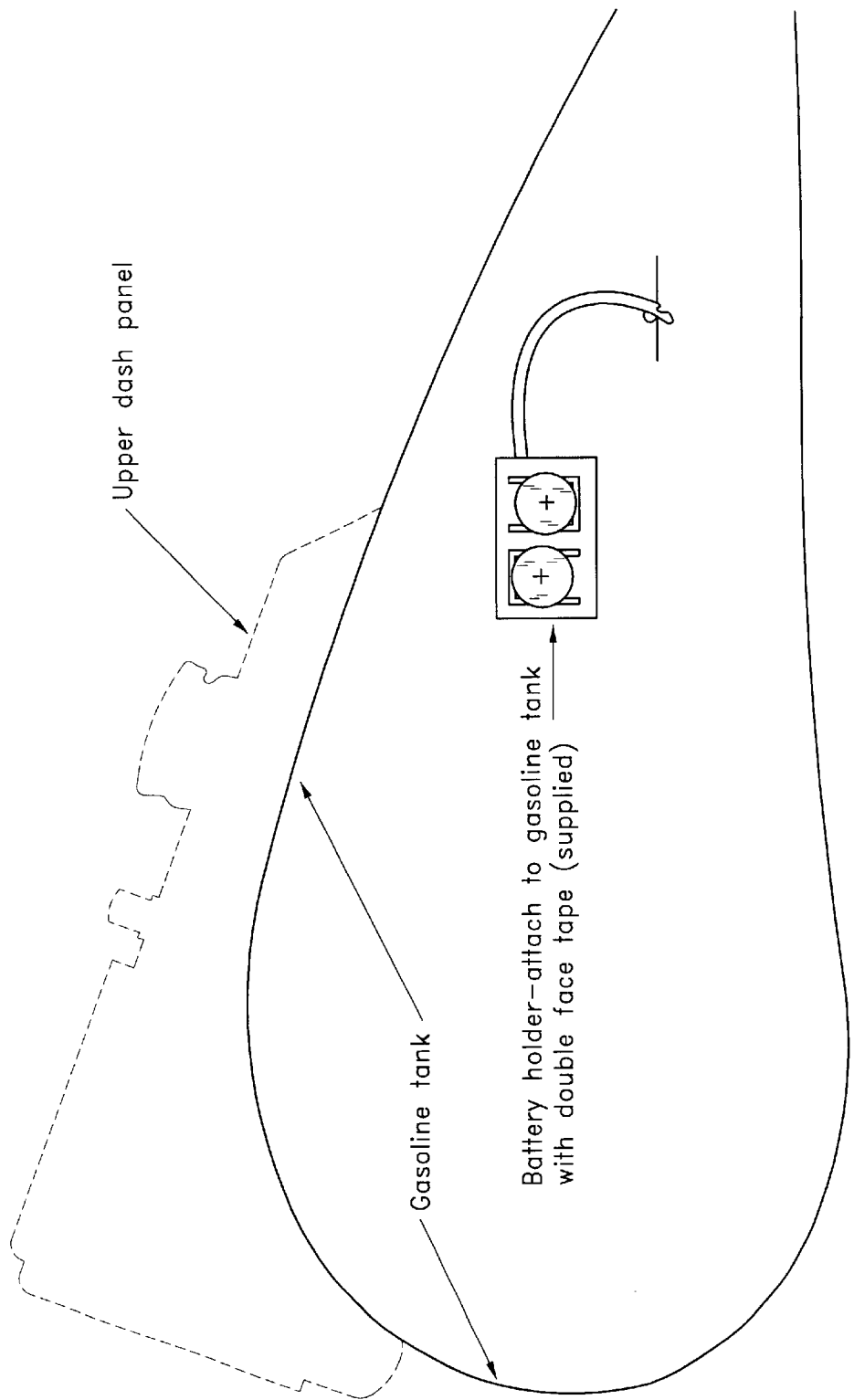
FIG. 6 is a schematic view of an optional battery holder that may be used with the remote control apparatus arrangement.
Figure 7:
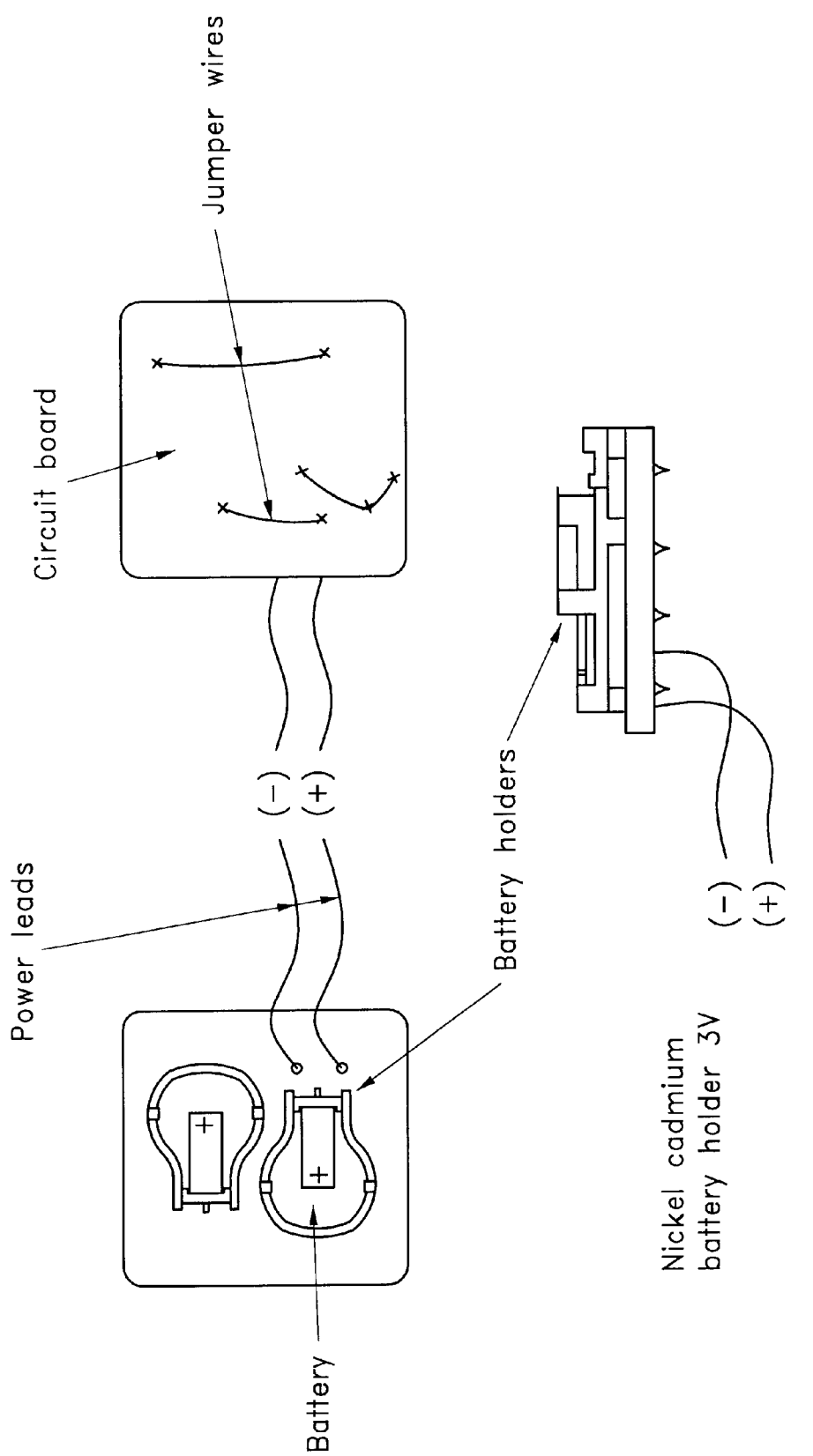
FIG. 7 is yet another schematic view of an optional battery holder that may be used with the remote control apparatus arrangement.
Figure 10:
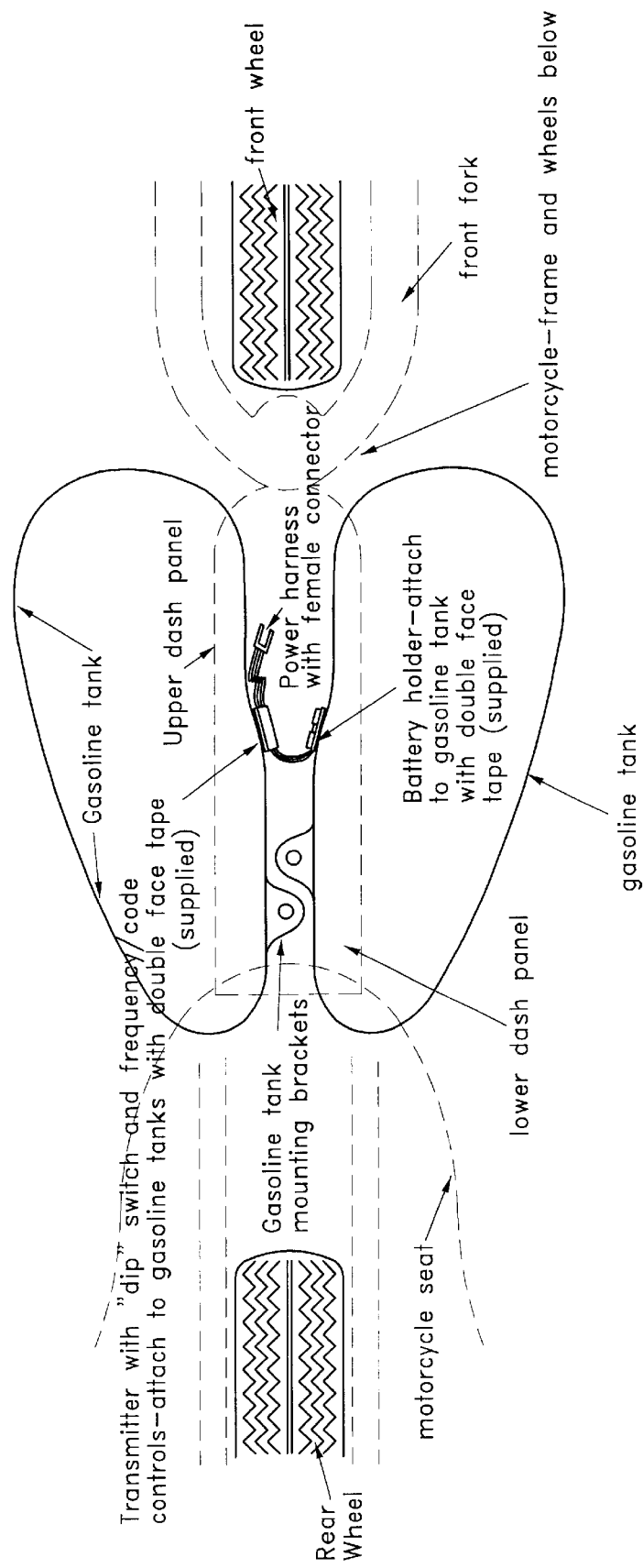
FIG. 10 is a top schematic view illustrating a mounting arrangement for a remote control apparatus arrangement.
Figure 11:
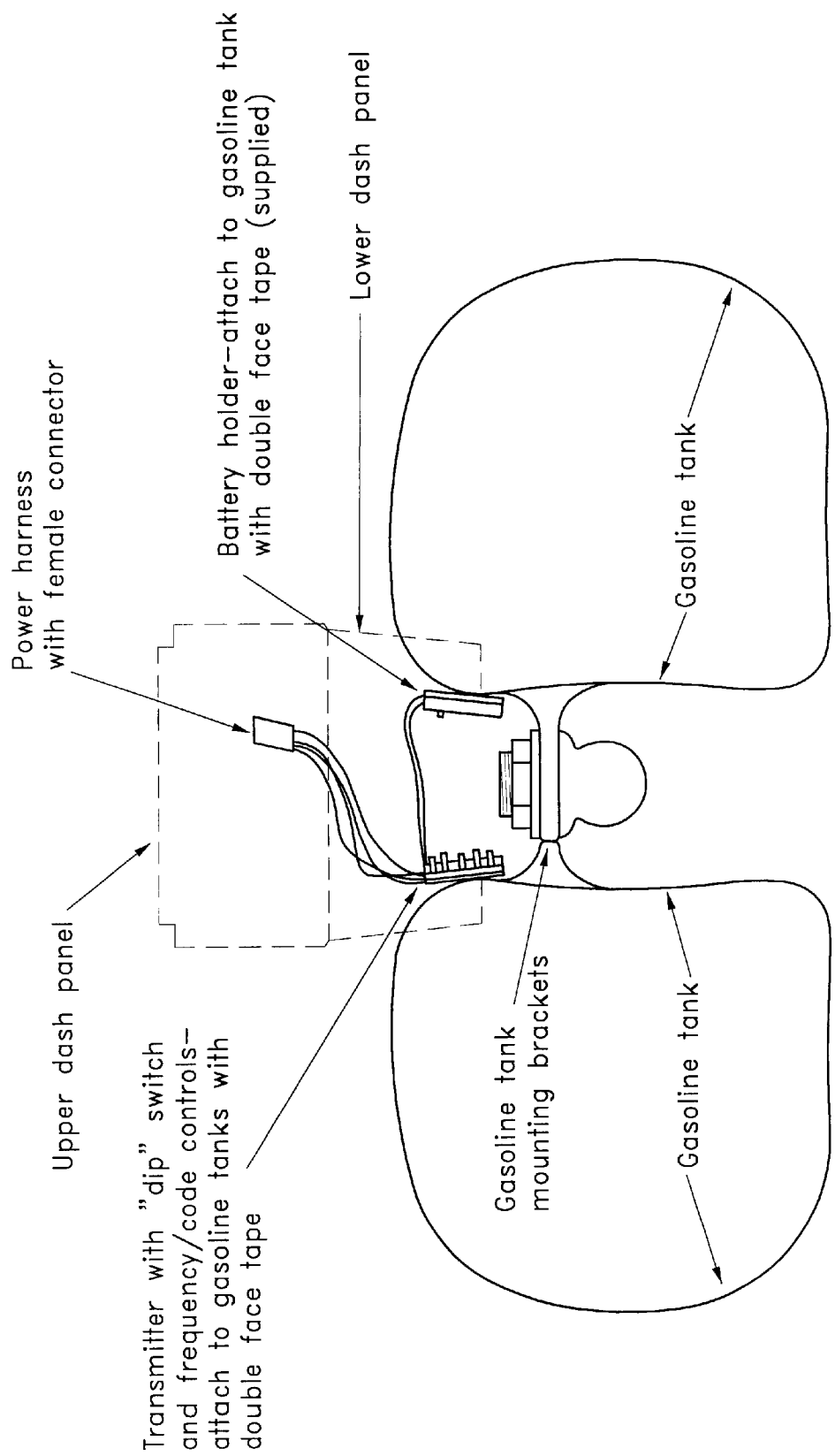
FIG. 11 is a rear view of FIG. 10.
Figure 12:
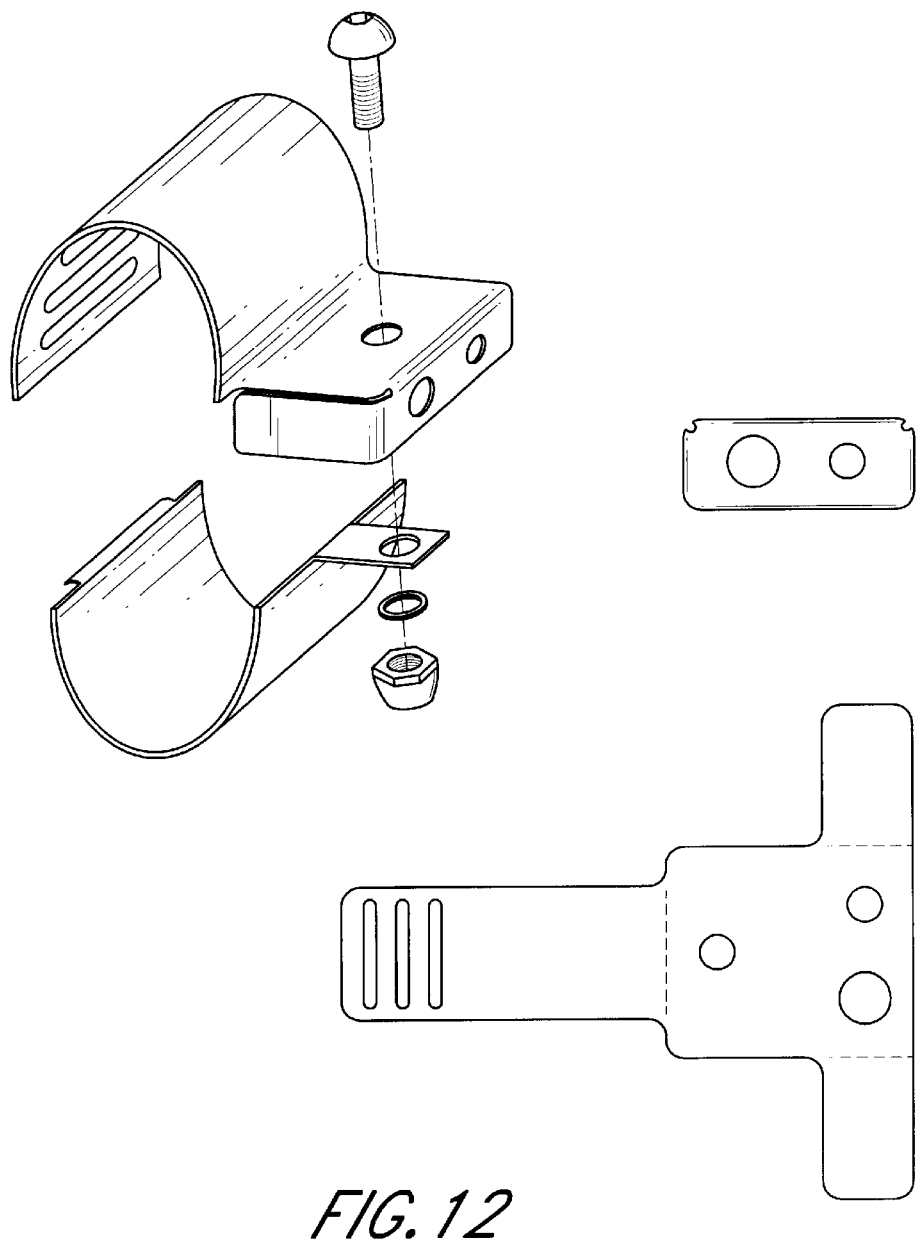
FIG. 12 is a detailed drawing of a universal mounting bracket illustrative of one embodiment of a universal mounting bracket.

As illustrated in FIG. 3, the activation switch and the confirmation indicator are mounted to the upper dash pad and desirably extend through the dash pad. The leads of each of the elements are accessible in this location. The leads may form a male electrical connector or be attached in known manners to such a male electrical connector. In this fashion, the activation switch and confirmation indicator are easily connected to the remote control and to a remote power source which may have a female connector. Of course, one of skill in the art will readily recognize that the configuration of male and female connectors can be interchanged without changing the effective coupling.

In the illustrated embodiment, the remote control is mounted within a cavity defined, in part, by the two fuel tanks and the frame of the motorcycle. Advantageously, the remote control is mounted below the lower dash panel or below the seat to be readily accessible through an access opening. This placement allows easy access for reprogramming and repair should repair become necessary. Additionally, this internal location helps to reduce the exposure of the circuitry to adverse weather and excessive water. Desirably, the remote control is supplied with a vibration damping element or otherwise configured or mounted to reduce the amplitude and degree of vibration transferred into the remote control. Additionally, any switchable elements (i.e., frequency and dip switches) may be altered to resist movement induced by vibration. For instance, the switches may be mini-slide switches or the like which require a positive application of force to move.

While any suitable fastening technique may be used, Applicants have found that two part Velcro performs adequately in most applications. In such applications, the surfaces must be clean and dry to allow proper adhesion of the backing surface of each Velcro part. Additionally, double face tape or the like may be utilized. It is also contemplated that a bracket which extends away from the frame of the motorcycle may be utilized. In such an instance, the bracket could be mounted to the frame in conjunction with the fuel tank mounting brackets.

The illustrated remote control is a remote control having a programmable configuration. For instance, the remote control is provided with a frequency and code control configuration allowing the operator to pre-program a code which corresponds to a code of the apparatus that is controlled thereby. Moreover, the remote control may have a key pad to allow an access code to be entered. In some embodiments, such a key pad will be no larger than a telephone touch pad so that the key pad can be easily mounted within the lower dash of the motorcycle.

The key pad allows four and six digit access codes, such as those commonly used for entrance gates, to be entered while seated on the motorcycle. Additionally, this arrangement increases security as the operator can remain safely on the motorcycle while gaining entrance to his house, garage or the like, or activating or deactivating a number of appliances such as lights, alarms and the like.

In one embodiment, the remote control has a set of dip switches which control the code setting. To operate a device, the remote control code must match the receiver code. By moving each of the dip switches up or down to match those of the receive, the required code can be duplicated. In the illustrated embodiment, the switches have a top, middle, and bottom position; however, in some receivers only a top and bottom position are provided. Accordingly, the top position of the remote control corresponds to the top position of the receiver and the bottom position of the remote control corresponds to the bottom position of the receiver. The middle position is not utilized in such configurations.

The remote control also has a programmable frequency switch. In one configuration, the switch simply adjusts between three preset frequencies. Simply matching the preset frequency to the frequency of the receiver may be necessary. By changing the frequency, the receiver and remote control may be distinguished from the receiver and remote control of neighboring facilities.

The remote control is in electrical communication with a power source. The power source is preferably independent from the motorcycle's electrical system. In such instances, the remote control is in electrical communication with either an internal battery or a battery holder which may be remotely located relative to the remote control. For instance, the battery holder may be mounted within the same cavity as the remote control. Moreover, similar to the remote control, the battery holder may be secured using double side tape, Velcro or any other suitable fastening technique, as discussed above.

The power sources, such as batteries, desirably provide ample power to allow the remote control to function. In the illustrated embodiment, the battery holder carries a single 12 volt battery. It is contemplated that other power sources can also be used. For instance, but without limitation, depending upon the application, a rechargeable battery may be used which is recharged either by a wall plug in as is known or by a trickle of electrical power from the vehicle's electrical system. Advantageously, the battery holder and/or remote control may be mounted in a rear portion of the cavity to be easily accessed through an access opening which may be formed below the seat or below the lower dash panel. In this fashion, the batteries may be readily accessed and changed when their stored power falls below a predetermined level.

While the above-described remote control arrangement allow the operator to use a pre-existing receiver, it is also contemplated that the remote control could be utilized with a new or altered receiver. The receiver could be wired in series to the original receiver and allow the remote control to communicate with the new receiver while allowing existing remote controls to communicate with the existing receiver. The new receiver could have an antenna allowing the range of the receiver to be increased. Additionally, the receiver could be a so-called "smart receiver" which is able to learn a code from an individualized remote control. The receiver technology can scramble the frequency code with each use. The new code is used once and scrambled again as is known.

Figure 13:
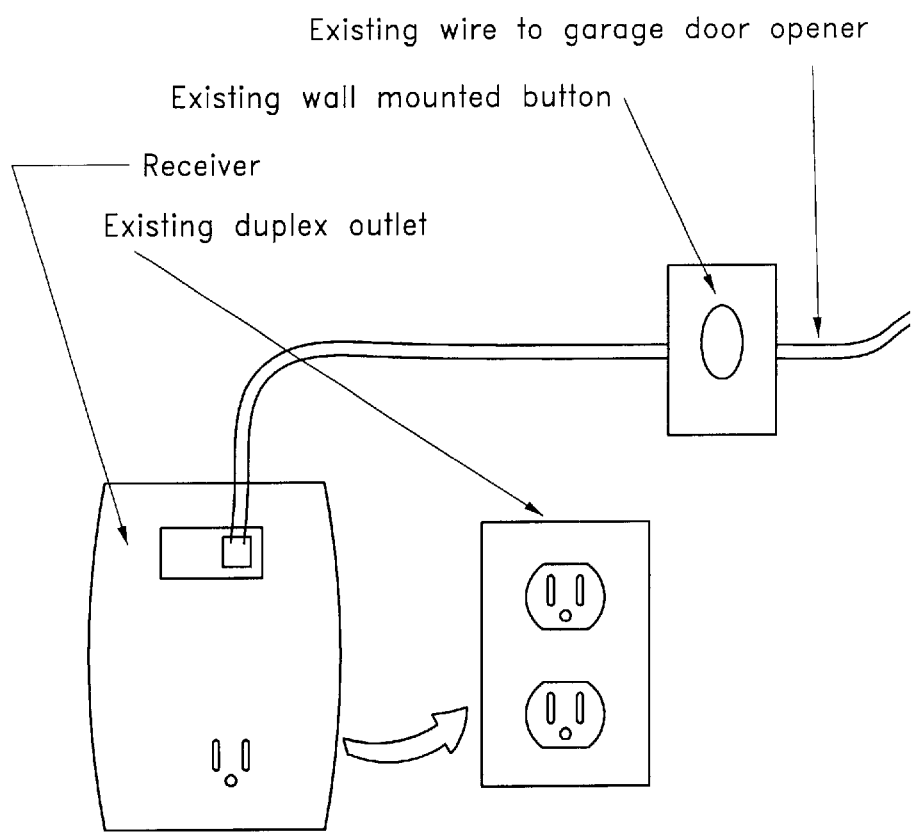
FIG. 13 is a schematic diagram for an optional receiver.
Figure 18:
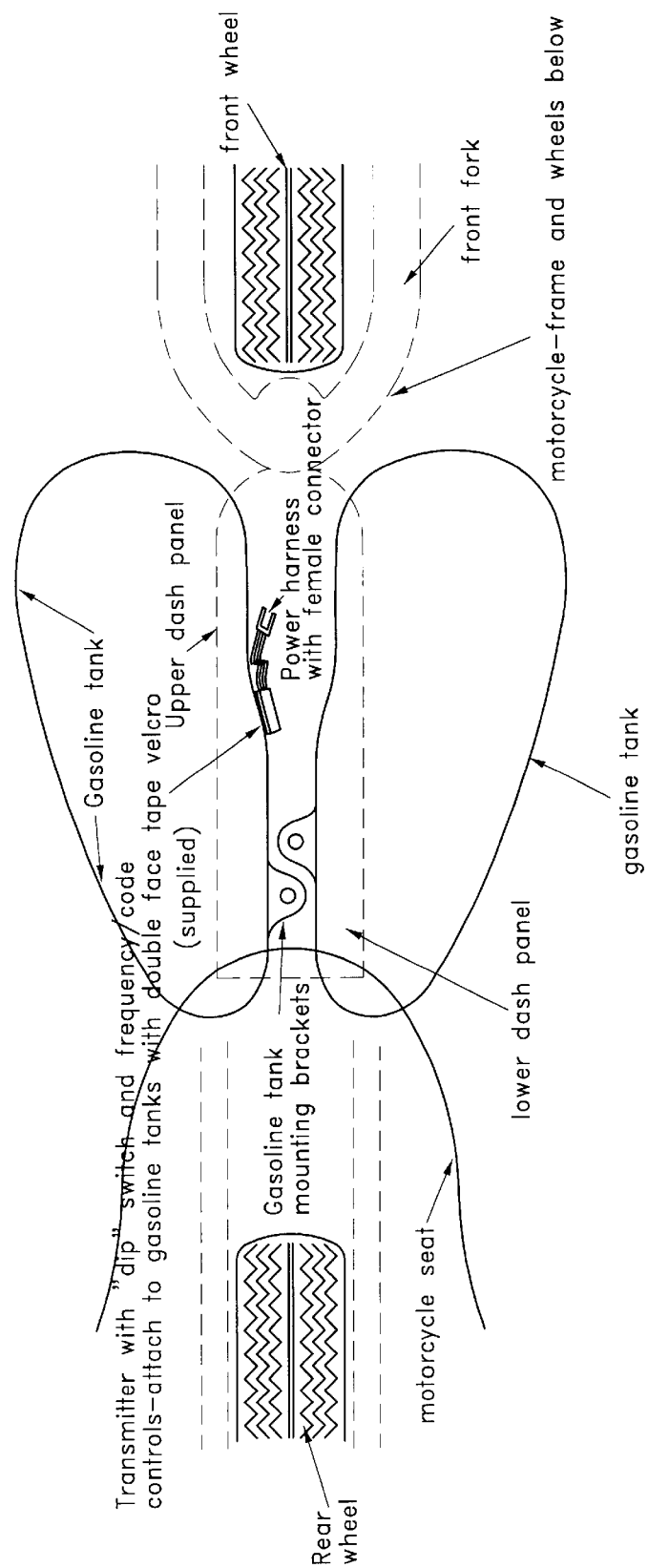
FIG. 18 is a top schematic view illustrating a mounting arrangement for another remote control apparatus.
Figure 19:
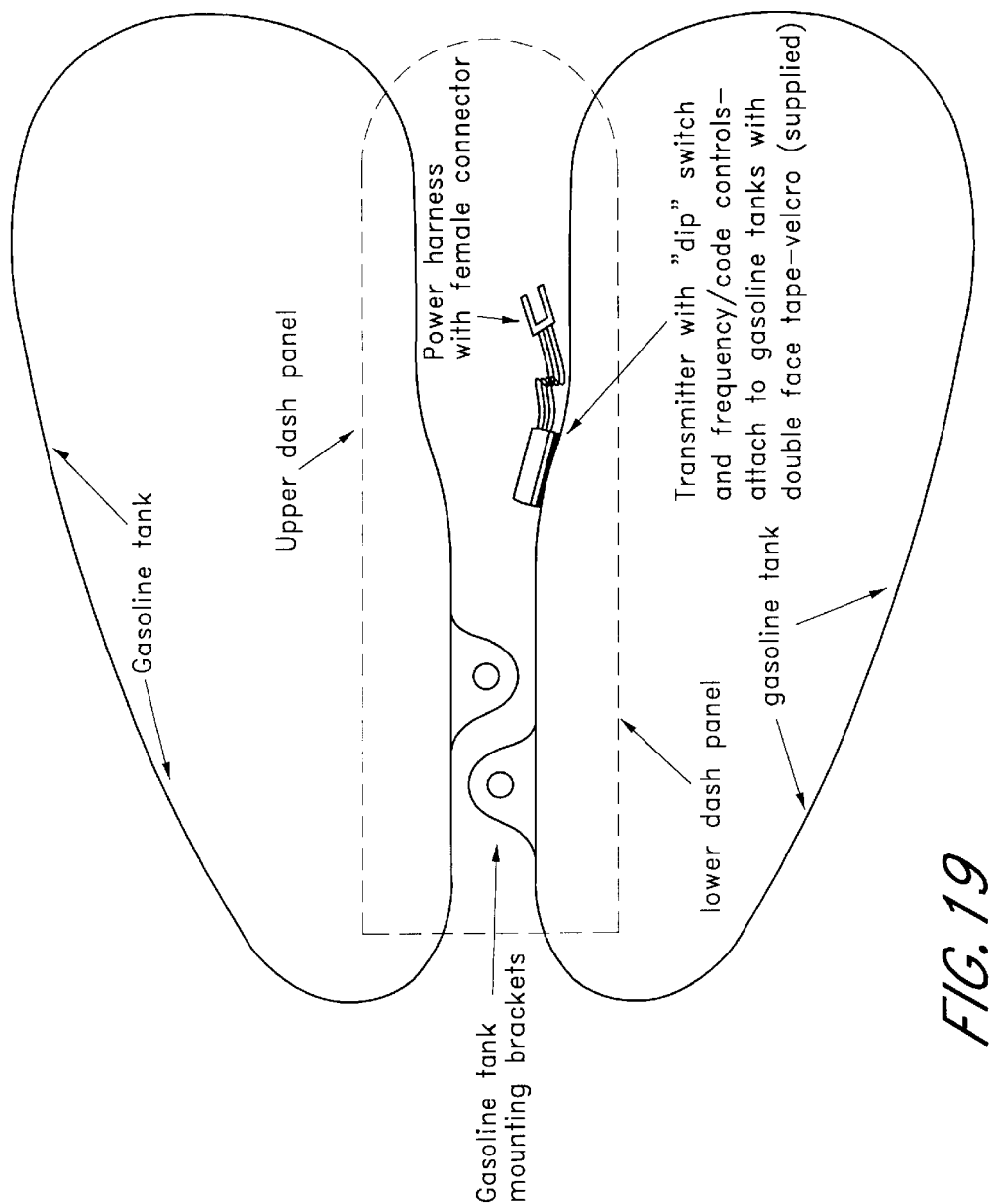
FIG. 19 is another top schematic view illustrating a mounting arrangement for a remote control apparatus arrangement.
Figure 20:
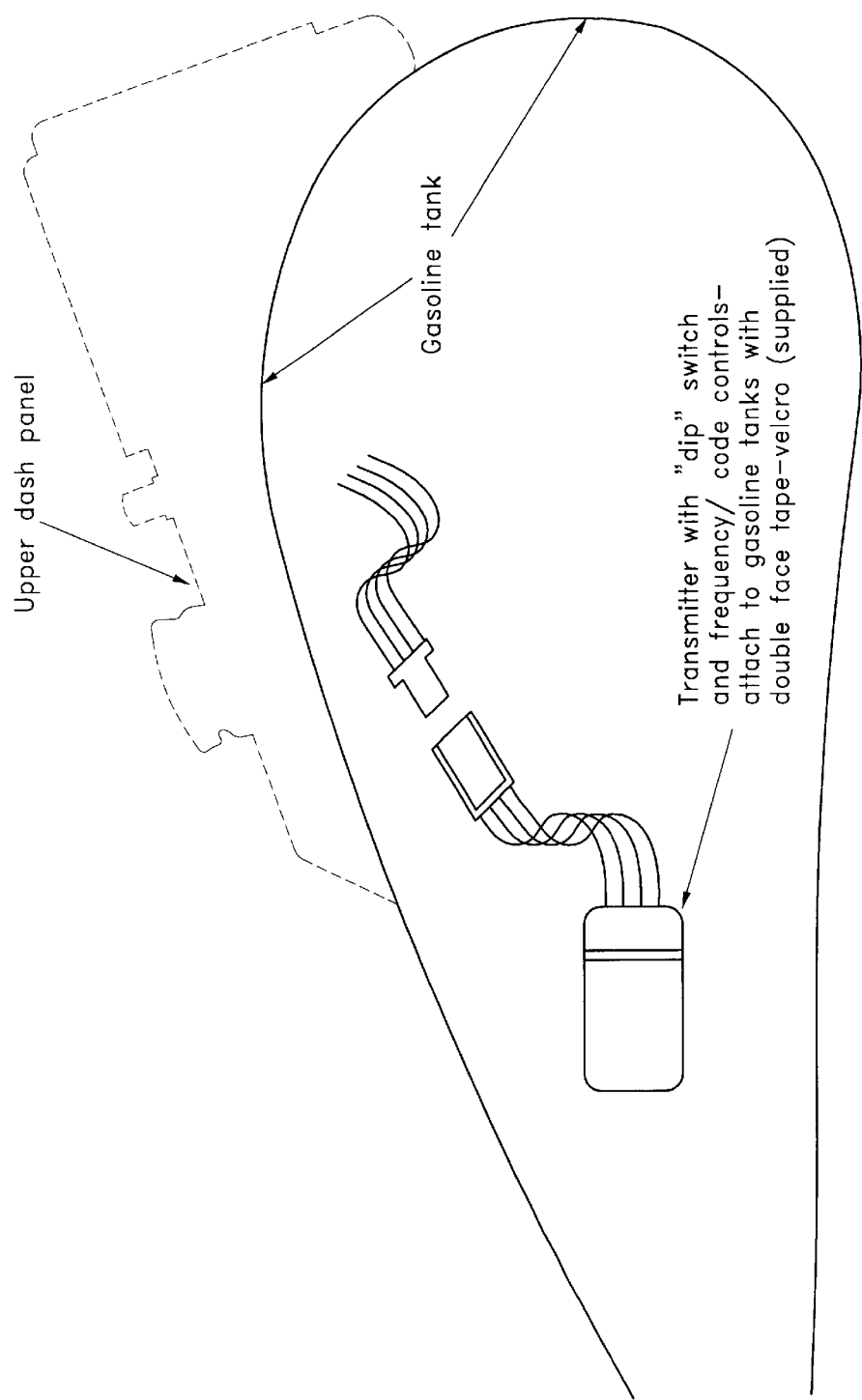
FIG. 20 is another schematic view of a remote control apparatus arrangement.
Figure 21:
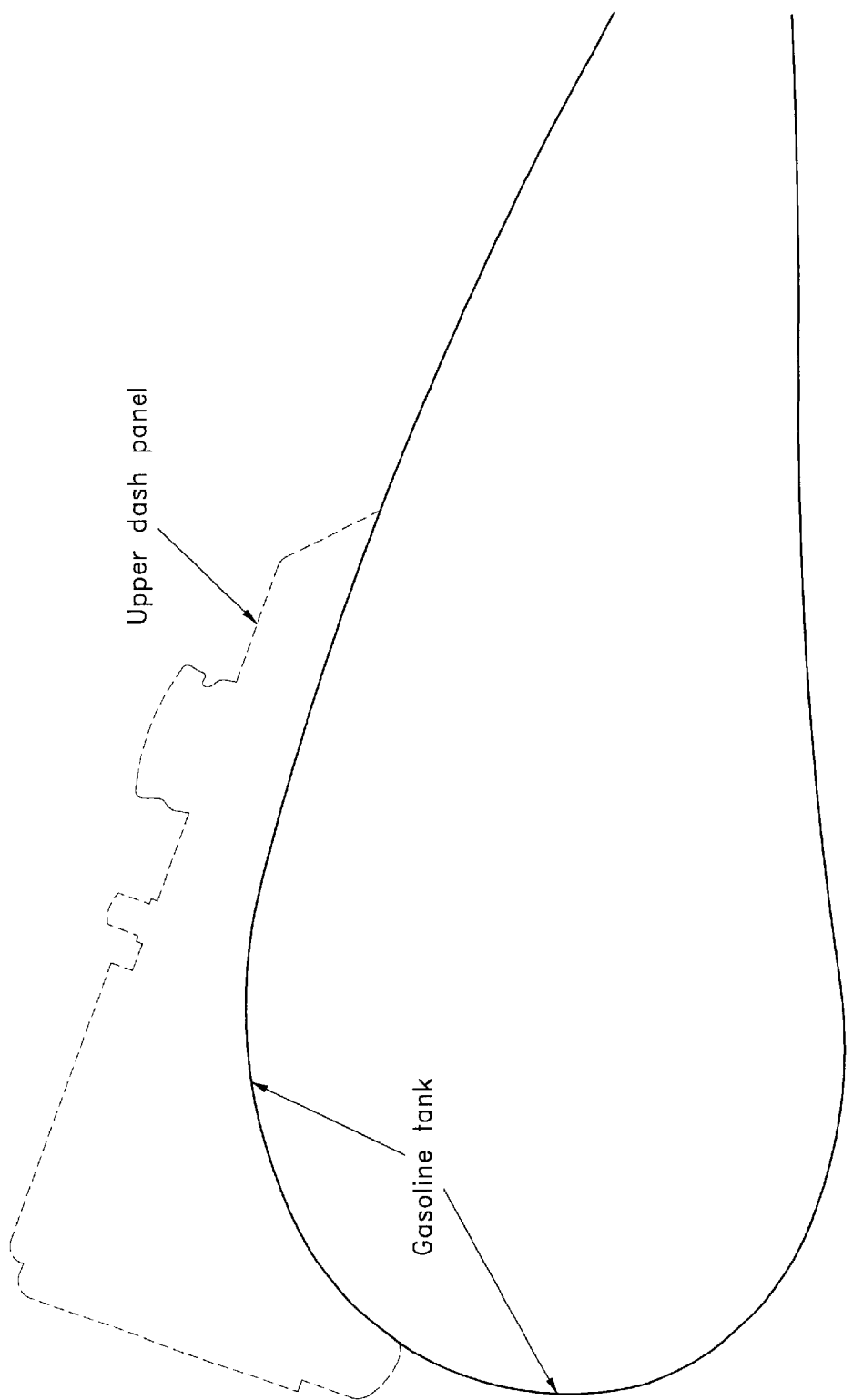
FIG. 21 is a side view of a motorcycle illustrating the location of the upper dash panel relative to the gasoline tank.
Figure 22:
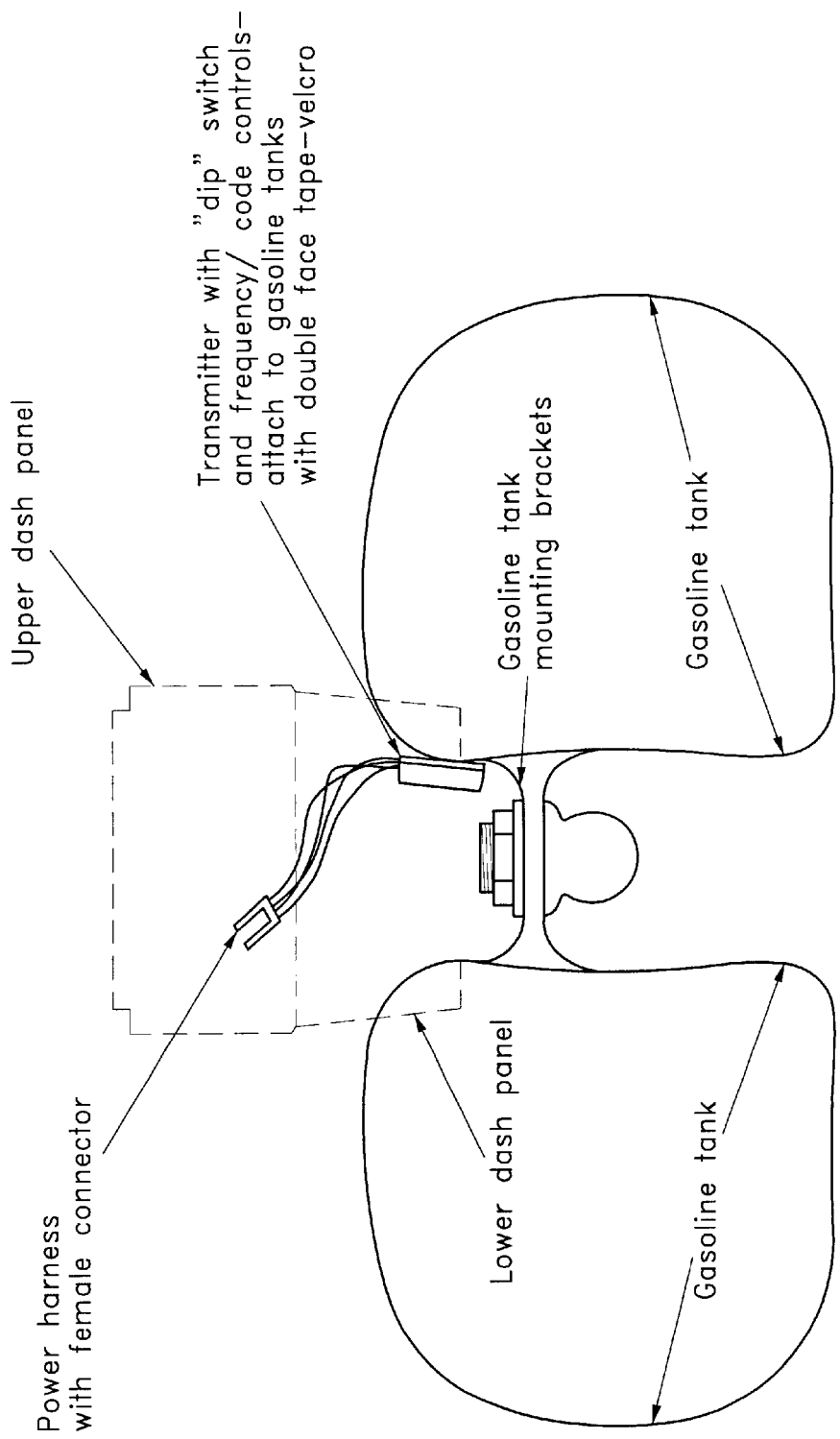
FIG. 22 is a rear view of FIG. 19.
Figure 23:
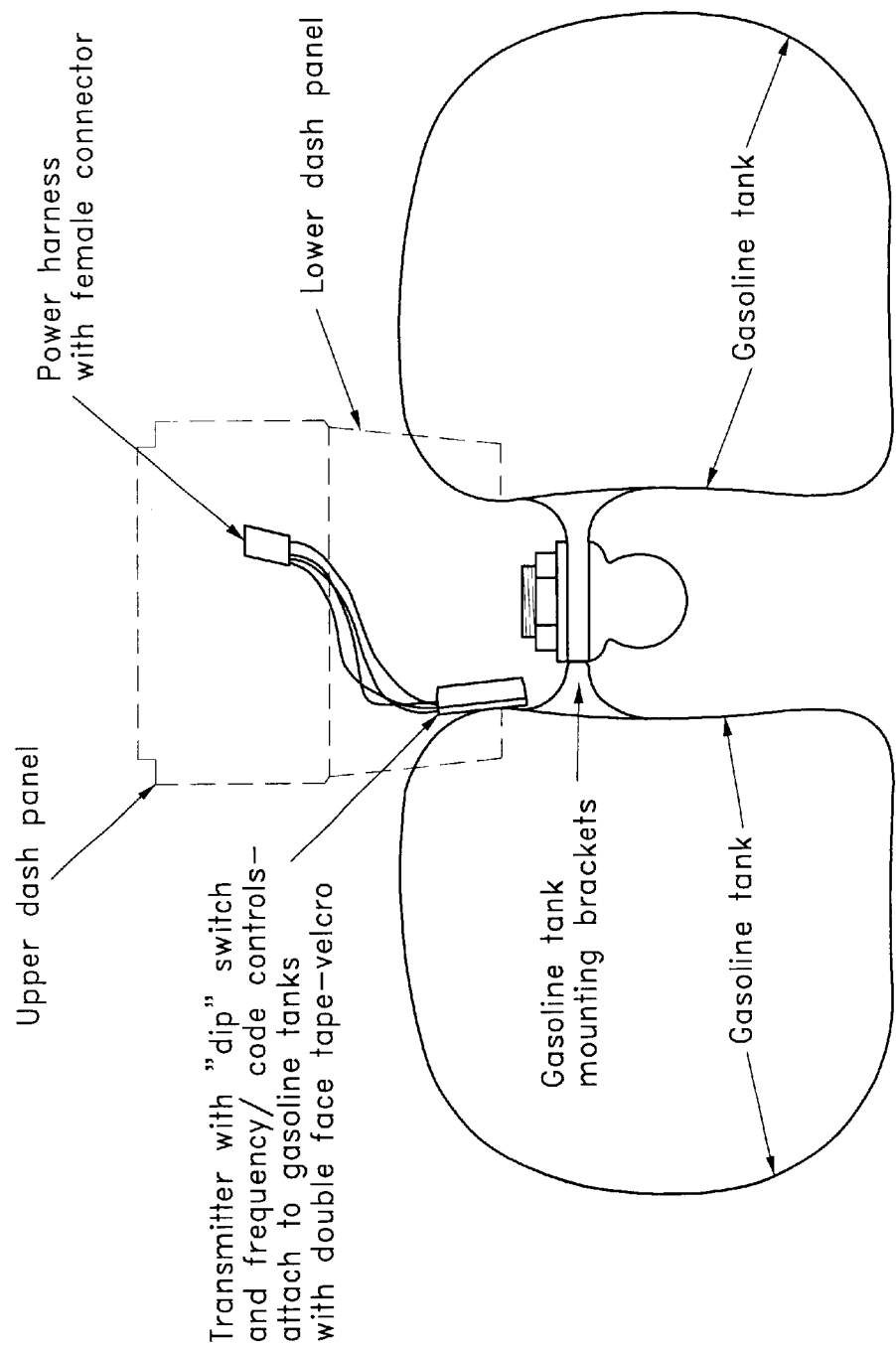
FIG. 23 is a rear view of FIG. 18.

With reference to FIG. 13, the new receiver may plug into a wall outlet. As will be recognized by those of skill in the art, the receiver will have a receiving antenna which will detect the emission of an appropriate signal from a transmitter, such as a remote control. The receiver is wired through an existing wall switch to control a device, by overriding the existing wall switch for instance. In this fashion, very little wiring is affecting in the existing device and structure.

Although the remote control is arranged within a sheltered cavity, the remote control can be provided with a weatherproof enclosure. Additionally, the wires may be connected with weather proof shrouds or all-weather electrical connectors. In this fashion, the remote control can work in all types of weather and under even the most adverse conditions.

Although this invention has been described in terms of a certain embodiment, other embodiments apparent to those of ordinary skill in the art also are within the scope of this invention. Thus, various changes and modifications may be made without departing from the spirit and scope of the invention.

What is claimed is:

1. A motorcycle comprising a generally longitudinal frame rail, a pair of fuel tanks mounted side by side along said frame rail, a dash panel positioned over an upper portion of said pair of fuel tanks and comprising an outside surface, a cavity being defined by said dash panel and a corresponding inside surface of each of said pair of fuel tanks, a remote control transmitter being positioned within said cavity, an activation switch and a confirmation indicator extending through said outside surface of said dash panel, said activation switch being in electrical communication with said remote control transmitter and said confirmation indicator being in electrical communication with at least one of said remote control transmitter and said remote control transmitter.

2. The motorcycle of claim 1, wherein the activation switch is of a momentary-type.

3. The motorcycle of claim 1 further comprising a seat positioned over said frame rail and rearward of at least a portion of said pair of fuel tanks, said cavity extending into a region located generally below a portion of said seat and said seat forming an access cover into said cavity.

4. The motorcycle of claim 1, wherein said dash panel comprises an upper portion and a lower portion, said confirmation indicator and said activation switch being disposed in said upper portion and said remote control transmitter being disposed beneath said lower portion.

5. The motorcycle of claim 1 further comprising a mounting bracket, said confirmation indicator and said activation switch both being mounted in said mounting bracket and said mounting bracket being secured to said motorcycle.

6. The motorcycle of claim 5, wherein said mounting bracket is secured to said frame rail.

7. The motorcycle of claim 6, wherein said mounting bracket comprises at least a pair of opposing members that are adapted to be secured in position on opposing sides of said frame rail.

8. The motorcycle of claim 1 further comprising a vibration damping component positioned between said remote control transmitter and a surface of said motorcycle.

9. The motorcycle of claim 8, wherein said surface of said motorcycle is a surface of one of said pair of fuel tanks.

10. The motorcycle of claim 9 further comprising a bracket interposed between said vibration damping component and said surface of said motorcycle.

11. The motorcycle of claim 1 further comprising an energy source that is coupled to said remote control transmitter.

12. The motorcycle of claim 11, wherein said energy source is a battery used for various electrical components of said motorcycle.

13. The motorcycle of claim 11, wherein said energy source comprises a battery holding housing and said housing is disposed within said cavity.

* * * * *